United States Patent [19]

Ohshita

[11] Patent Number: 5,646,777
[45] Date of Patent: Jul. 8, 1997

[54] KEPLERIAN ZOOM FINDER OPTICAL SYSTEM

[75] Inventor: Koichi Ohshita, Tokyo, Japan

[73] Assignee: Nikon Corporation, Tokyo, Japan

[21] Appl. No.: 329,320

[22] Filed: Oct. 26, 1994

Related U.S. Application Data

[62] Division of Ser. No. 44,600, Apr. 9, 1993, Pat. No. 5,381,265.

[30] Foreign Application Priority Data

Apr. 16, 1992 [JP] Japan ................................ 4-96642

[51] Int. Cl.$^6$ .............................. G02B 23/14; G03B 13/08
[52] U.S. Cl. .......................... 359/422; 359/432; 359/689; 396/378; 396/379
[58] Field of Search ........................ 359/362, 420, 359/424, 432, 676–678, 689; 354/199–201, 219–225, 154–155; 396/373–386

[56] References Cited

U.S. PATENT DOCUMENTS

| | | | |
|---|---|---|---|
| 4,526,444 | 7/1985 | Fantone et al. | 359/362 |
| 4,715,692 | 12/1987 | Yamada et al. | 354/219 |
| 4,779,969 | 10/1988 | Sato et al. | 359/422 |
| 4,906,078 | 3/1990 | Inabata et al. | 359/422 |
| 4,972,216 | 11/1990 | Ueda et al. | 354/225 |
| 5,052,787 | 10/1991 | Sugawara | 354/225 |
| 5,054,897 | 10/1991 | Ozawa | 359/676 |
| 5,257,055 | 10/1993 | Cho et al. | 354/222 |
| 5,381,265 | 1/1995 | Ohshita | 359/432 |

*Primary Examiner*—Thong Nguyen
*Attorney, Agent, or Firm*—Shapiro and Shapiro

[57] ABSTRACT

A Keplerian zoom finder optical system has an objective lens comprising, in succession from the object side, a first lens unit of negative refractive power, a second lens unit of positive refractive power, and a third lens unit of positive refractive power and having positive refractive power as a whole, and an eyepiece of positive refractive power for enlarging and observing the focused image of the objective lens therethrough. The air gap between the first lens unit and the second lens unit is varied to thereby vary finder magnification.

2 Claims, 3 Drawing Sheets

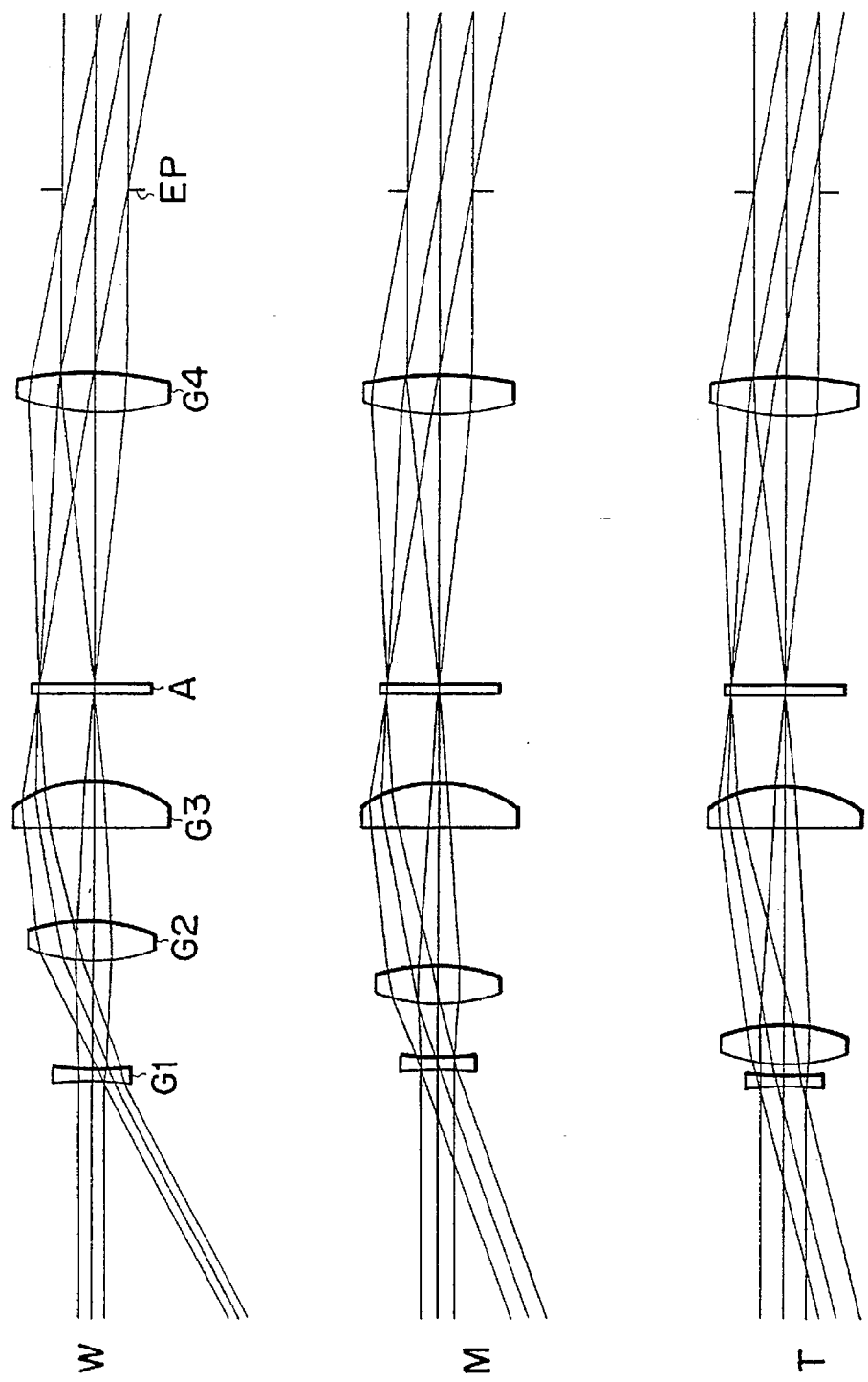

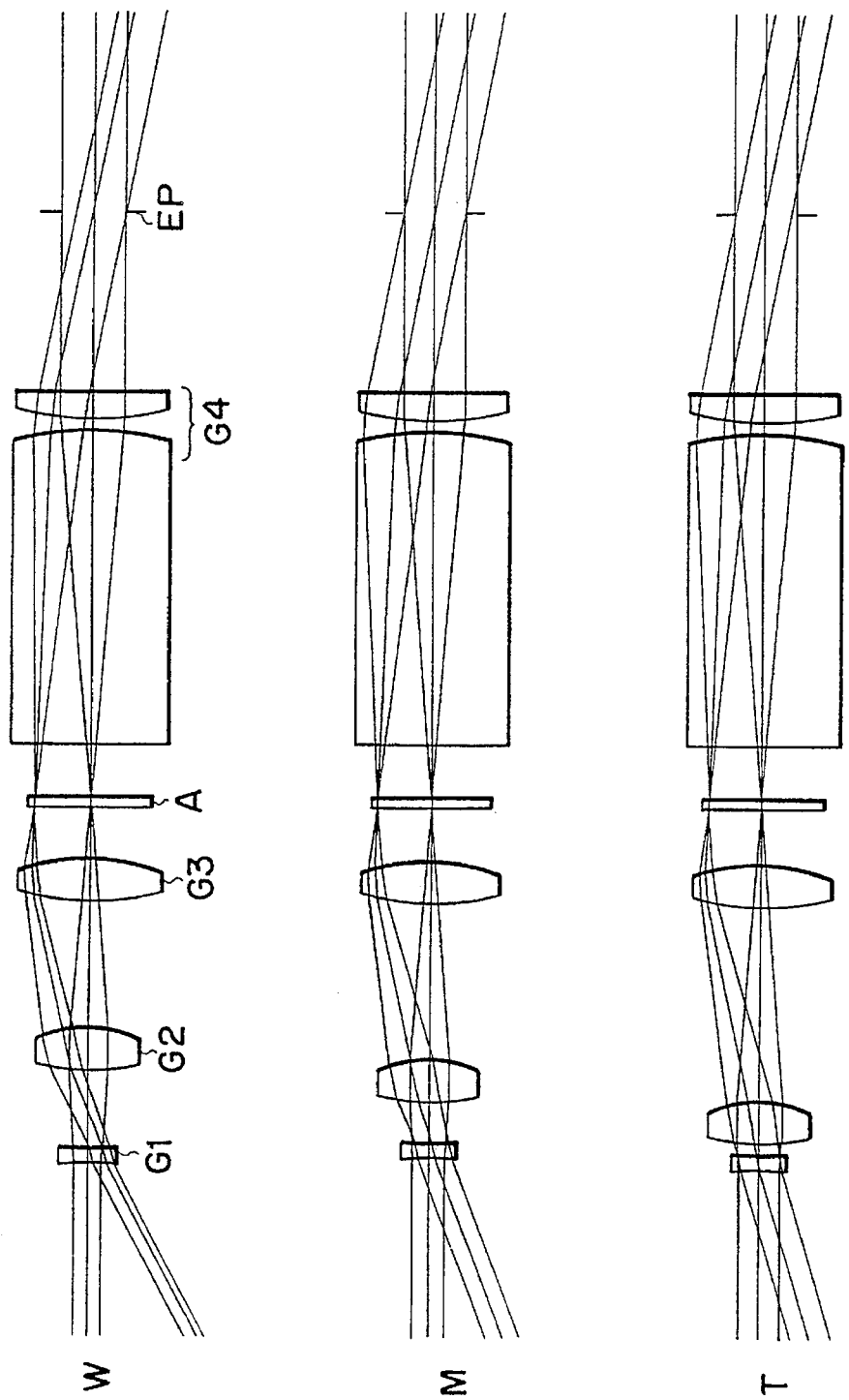

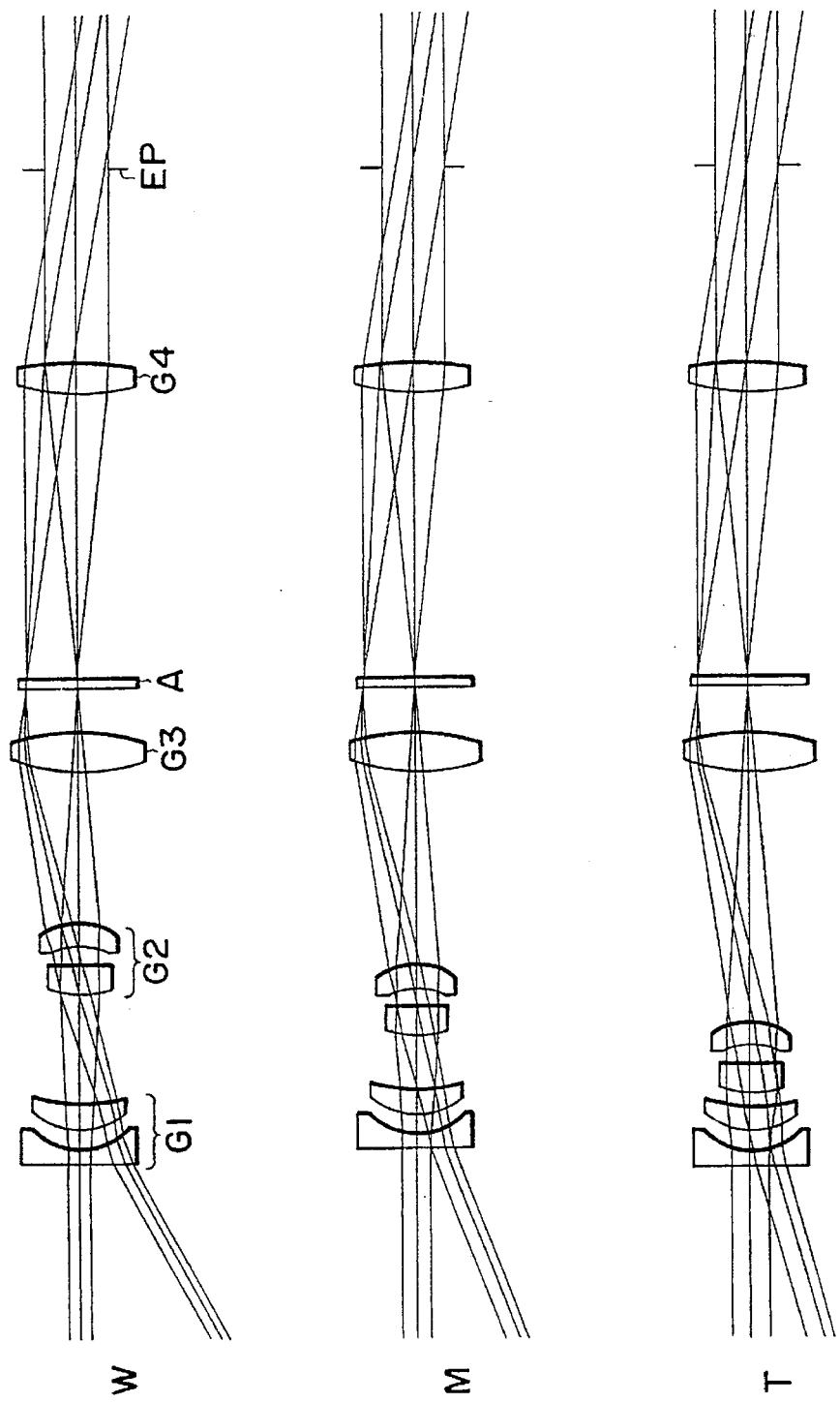

KEPLERIAN ZOOM FINDER OPTICAL SYSTEM

This is a division of application Ser. No. 08/044,600 filed Apr. 9, 1993 now U.S. Pat. No. 5,381,265.

BACKGROUND OF THE INVENTION

1. Field of the Invention

This invention relates to a compact Keplerian finder optical system of variable magnification.

2. Related Background Art

In recent years, in the field of lens shutter cameras for example, cameras containing photo-taking lenses of variable focal length therein have become the mainstream. Along therewith, finders of continuously variable magnification have been required. Particularly Keplerian finders have been enjoying increasing demand as finders for high-class cameras because the finder field is divided clearly by a field frame and ghost and flare are insignificant. Therefore, in recent years, various Keplerian finder optical systems of variable magnification have been proposed, as for example, in U.S. Pat. No. 4,842,395 and Japanese Laid-Open Patent Application No. 1-116616.

However, the Keplerian finder optical system adopts a system in which a real image formed by an objective lens is enlarged and observed through an eyepiece, and this has led to the disadvantage that dust adhering to a field frame or a lens disposed near it, and bubbles or other defects in the lens, are also enlarged and seen at the same time. To overcome this disadvantage, it will suffice if nothing is disposed near the focal plane of the objective lens, but if this is done, the feature of the Keplerian finder that the field of view is divided clearly will be eliminated. When conventional real image type finders of simple construction are viewed from such a point of view, any one of them has required a so-called field lens near the focal plane of the objective lens and no consideration for coping with the above-noted disadvantage has been given.

Further, in recent years, the plastic molding technique has made rapid progress and now almost all of the optical parts of finders from aspherical lenses to prisms of complicated shapes can be provided by molded plastic articles. However, it is difficult to avoid minute dust or bubbles mixing with molded plastic articles during the molding thereof, and where a field lens or the like disposed near the focal plane is provided by a molded plastic article, dust in the field lens is conspicuously observed and this has remarkably reduced the rate of non-defectiveness of finders.

Also, mentioning a problem in aberration correction, particularly the finder proposed in the aforementioned U.S. Pat. No. 4,842,395, which comprises a few constituents, has a difficulty in the correction of the fluctuation of distortion, and among finders having a field of view of 50° or more at the wide angle end, there has been none in which distortion is corrected well.

SUMMARY OF THE INVENTION

So, the present invention has as an object the provision of a finder which is simple in construction and yet in which aberrations are corrected well and dust in the finder field is inconspicuous.

To achieve the above object, the present invention provides as its basic construction a Keplerian finder optical system having an objective lens of positive refractive power as a whole comprising, in succession from the object side, a first lens unit G1 of negative refractive power, a second lens unit G2 of positive refractive power and a third lens unit G3 of positive refractive power, and an eyepiece G4 of positive refractive power for enlarging and observing the focal image of the objective lens therethrough, the air gap between the first lens unit G1 and the second lens unit G2 being varied to thereby vary finder magnification, and satisfies the following condition:

$$0.44 < D/fW < 0.80 \tag{1}$$

where

D: the back focal length of the whole objective lens;

fW: the focal length of the objective lens at the wide angle end.

BRIEF DESCRIPTION OF THE DRAWINGS

FIG. 1A is a lens cross-sectional view of a first embodiment of the invention showing the state at the wide angle end (W), FIG. 1B is a lens cross-sectional view of the first embodiment showing the state at the medium distance (M), and FIG. 1C is a lens cross-sectional view of the first embodiment showing the state at the telephoto end (T);

FIG. 2A is a lens cross-sectional view of a second embodiment showing the state at the wide angle end (W), FIG. 2B is a lens cross-sectional view of the second embodiment showing the state at the medium distance (M), and FIG. 2C is a lens cross-sectional view of the second embodiment showing the state at the telephoto end (T);

FIG. 3A is a lens cross-sectional view of a third embodiment showing the state at the wide angle end (W), FIG. 3B is a lens cross-sectional view of the third embodiment showing the state at the medium distance (M), and FIG. 3C is a lens cross-sectional view of the third embodiment showing the state at the telephoto end (T).

DETAILED DESCRIPTION OF THE INVENTION

The finder of the present invention, as shown, for example, in FIG. 1A of the accompanying drawings, is of a construction having an objective lens of three-unit construction comprising, in succession from the object side, a first lens unit G1 of negative refractive power, a second lens unit G2 of positive refractive power having at least one surface thereof made into an aspherical surface, and a third lens unit G3 of positive refractive power performing the function of a so-called field lens, a field frame A and a fourth lens unit G4 of positive refractive power which is an eyepiece. The first lens unit G1 is moved on a non-linear orbit so as to keep the image plane of the objective lens constant while the second lens unit G2 is moved on the optical axis toward the object side, whereby a continuous change in magnification from a low magnification to a high magnification can be obtained. Further, in the present invention, the third lens unit G3, which has heretofore been near the imaging plane of the objective lens, is disposed more adjacent to the object side and is spaced apart from the field frame A which is the imaging plane. As a result, dust on the surface of the third lens unit G3 and defects therein have great plus visibility when they are observed through the eyepiece G4 and therefore, they become blurred and inconspicuous, and the rate of non-defectiveness will not be reduced even if the third lens unit G3 is formed of a plastic material. However, if the third lens unit G3 is disposed adjacent to the object side in spaced-apart relationship with the field frame A, the effect of the third lens unit G3 as a field lens will be weakened, and this can result in an increase in the effective diameter of the whole objective lens and the aggravation of aberrations. So, in the present invention, the optimum position of the third lens unit G3 is set by conditional expression (1). If the upper limit of conditional expression (1) is exceeded, the effect of the third lens unit G3 as a field lens will be weakened, and this is not preferable. If conversely, the lower limit of conditional expression (1) is exceeded, defects of the third lens unit G3 will be apt to become conspicuous and the rate of non-defectiveness of the entire finder will be reduced, and this is not preferable.

To achieve the object of the present invention, it is necessary that the following conditional expressions be further satisfied:

$$-2.4 < 1/fW < -1.8 \quad (2)$$

$$-1.7 < 1/f2 < -1.1 \quad (3)$$

$$1.2 < f3/f2 < 1.5 \quad (4)$$

$$-1.2 < rB/rA < 0 \quad (5)$$

$$30 < v1 < 40 \quad (6)$$

where f1: the focal length of the first lens unit G1;

f2: the focal length of the second lens unit G2;

f3: the focal length of the third lens unit G3;

rA: the radius of curvature of that surface of the third lens unit G3 which is adjacent to the object side;

rB: the radius of curvature of that surface of the third lens unit G3 which is adjacent to the image side;

v1: the Abbe number of the negative lens in the first lens unit G1 which is most adjacent to the object side.

Each of the above conditional expressions will hereinafter be described.

Conditional expression (2) is for prescribing the imaging magnification of the second lens unit G2.

A finder is generally contained in a camera body and the size of a finder optical system is considered to be determined by the greatest full length between the telephoto end to the wide angle end. Therefore, in a finder which is very compact at the wide angle end, but the full length of which extends at the telephoto end, the compactness at the wide angle end is not used efficiently, and vice versa. Therefore, in the case of a finder like that of the present invention of which the full length becomes greatest at the telephoto end or the wide angle end, it is considered that when the full lengths at the telephoto end and the wide angle end are equal to each other, the substantial full length of the finder becomes smallest. That is, if the upper limit of conditional expression (2) is exceeded, the full length at the telephoto end will be great, and if conversely, the lower limit of conditional expression (2) is exceeded, the full length at the wide angle end will be great, and any of these cases will impede the overall compactness of the finder, and this is not preferable.

Conditional expression (3) prescribes the focal length of the second lens unit G2. If the lower limit of this conditional expression is exceeded, the focal length of the second lens unit G2 will be too short and therefore, the spacing between adjacent lens units will be small and it will be difficult to secure the magnification change ratio. If the upper limit of this conditional expression is exceeded, the focal length of the second lens unit G2 will be too long and therefore, the compactness of the finder cannot be achieved.

Conditional expression (4) prescribes the focal length of the third lens unit G3. If the upper limit of this conditional expression is exceeded, the focal length of the third lens unit G3 will be too long and therefore, the effect of the third lens unit as a field lens will be weak, and the effective diameter of each lens will become apt to increase. If conversely, the lower limit of this conditional expression is exceeded, the imaging magnification of the third lens unit G3 will become small and therefore, necessarily a reduction in the finder magnification will be unavoidable.

Conditional expression (5) prescribes the shape of the third lens unit G3. Heretofore, in many finders, the third lens unit G3 has been made into a plano-convex lens having its convex surface facing the object side. The use of a plano-convex lens having its convex surface facing the object side is certainly effective for the correction of negative distortion at the wide angle end, but at the same time, it has caused the creation of great positive distortion at the telephoto end. So, in the present invention, in order to suppress the fluctuation of distortion, the third lens unit is formed into a biconvex lens or a plano-convex lens having its convex surface facing the eye side. If the upper limit of conditional expression (5) is exceeded, the fluctuation of distortion cannot be suppressed, and if conversely, the lower limit of this conditional expression is exceeded, the correction of negative distortion at the wide angle end will be difficult. Accordingly, the range of this expression is preferable. Also, it is to be understood that the lens shape when the third lens unit G3 includes an aspherical surface is prescribed by the paraxial radius of curvature, and when the reference radius of curvature is R and the cone coefficient is k and the secondary aspherical surface coefficient is C2, the paraxial radius of curvature r is defined by $r=1/(2 \cdot C2+1/R)$.

Conditional expression (6) is a conditional expression regarding the correction of chromatic aberration. To make the finder optical system compact, the refractive power of each lens must be made great, but in this case, on-axis chromatic aberration is apt to occur. To correct this, among the lenses, particularly the second lens unit G2 can be endowed with the achromatizing function as a cemented lens. However, this is against the purport of the present invention, which is intended to provide the simplification of construction. So, in the present invention, a construction is adopted in which the dispersion of the first lens unit G1 of negative refractive power is made greater than that of the second lens unit G2, thereby negating on-axis chromatic aberration. However, the use of this method, if it exceeds the limit, will lead to the risk of greatly enlarging the color deviation in the marginal portion of the field of view, i.e., so-called chromatic difference of magnification, at the wide angle end, because the first lens unit G1 has a great contribution to the off-axis rays at the wide angle end. That is, if the upper limit of this conditional expression is exceeded, the correction of on-axis chromatic aberration at the telephoto end will be insufficient, and if the lower limit of this conditional expression is exceeded, chromatic difference of magnification at the wide angle end will become very great, and this is not preferable.

Preferred embodiments of the present invention will hereinafter be described. FIGS. 1A, 1B and 1C are lens construction views of a first embodiment. FIG. 1A showing the state at the wide angle end (W), FIG. 1B showing the state at the medium distance (M), and FIG. 1C showing the state at the telephoto end.

The first embodiment comprises an objective lens comprising in succession from the object side, a first lens unit G1, a second lens unit G2 and a third lens unit G3, a field frame (reticle) A and an eyepiece unit G4, each of the units G1–G4 being comprised of a plastic single lens. The inverted image of an object on the field frame A is made erect by four reflecting mirrors, not shown, which are installed on the optical path between the second lens unit G2 to the fourth lens unit G4. The erection by the reflecting mirrors, as compared with the erection by a prism, has the advantage that optical defects in the prism (reflecting article) are not seen.

FIGS. 2A, 2B and 2C are lens construction views of a second embodiment, FIG. 2A showing the state at the wide angle end (W), FIG. 2B showing the state at the medium distance (M), and FIG. 2C showing the state at the telephoto end (T). The second embodiment comprises an objective lens comprising, in succession from the object side, a first lens unit G1, a second lens unit G2 and a third lens unit G3, a field frame A, a prism and an eyepiece unit G4, each of the first lens unit G1, the second lens unit G2 and the third lens unit G3 constituting the objective lens being a plastic single lens. The eyepiece is made of plastic. When as previously described, the distance between the field frame A and the entrance surface of the prism is short, defects in the prism are seen, and this is not preferable. Therefore, in the second embodiment, a sufficient spacing is kept between the field frame A and the entrance surface of the prism to thereby make defects in the prism inconspicuous. The image is made erect by a reflecting mirror, not shown, which is installed between the second lens unit G2 and the third lens unit G3, and three reflecting surfaces in the prism.

FIGS. 3A, 3B and 3C are lens construction views of a third embodiment, FIG. 3A showing the state at the wide angle end (W), FIG. 3B showing the state at the medium distance (M), and FIG. 3C showing the state at the telephoto end (T).

This embodiment is comprised of an objective lens comprising, in succession from the object side, a first lens unit G1 and a second lens unit G2 each comprising two lenses, and a third lens unit G3 which is a single lens, a field frame A, and an eyepiece unit G4. By the first lens unit G1 and the second lens unit G2 each being comprised of two lenses, the fluctuation of distortion is minimized. The image is made erect by four reflecting mirrors, not shown, which are installed on the optical path between the second lens unit G2 to the eyepiece unit G4.

Each of the first lens unit G1, the second lens unit G2 and the third lens unit G3 constituting the objective lens is made of plastic. The eyepiece unit G4 is also made of plastic.

The field frame in each of the above-described embodiments is formed by printing or metal-evaporating a substance which does not transmit light therethrough on a glass substrate. Moreover, the field frame is of such structure that dust adhering to the prism and the third lens unit is almost inconspicuous and therefore, dust in the field of view will not be conspicuous during observation unless dust adheres to the glass substrate.

In the first to third embodiments, on the object side and the eye point side (EP) of the field frame A, air gaps wide as compared with the thickness of the field frame A are secured along the optical path, and when of the air gaps forward and rearward of the field frame A, the shorter on-axis gap is Ad and the focal length of the eyepiece unit G4 is fe, the following condition is satisfied:

$$0.14 < Ad/fe \quad (7)$$

The numerical data of the embodiments of the present invention and the corresponding numerical values of the above conditions are shown in tables below. In the tables below, the numbers at the left end represent surface numbers, r represents the radius of curvature, d represents the spacing between adjacent surfaces, ν represents the Abbe number, N represents the refractive index for d line ($\lambda=587.6$ nm), EP represents the eye point, X represents visibility, m represents the magnification, ω represents the angle of incidence, and h represents the incidence height of the ray of light. Also, the aspherical surfaces are marked with * and the surface of the field frame is marked with A, at the right of their surface numbers.

The aspherical surfaces are expressed by the following equation:

$$S(y) = \frac{y^2/R}{1 + (1 - k \cdot y^2/R^2)^{1/2}} + C2 \cdot y^2 + C4 \cdot y^4 + C6 \cdot y^6 + C8 \cdot y^8 + C10 \cdot y^{10}$$

where S(y) is the shape of the aspherical surface at a height y from the optical axis, R is a reference radius of curvature, k is a cone coefficient and Cn is the nth-order aspherical surface coefficient. The paraxial radius of curvature r is defined as $r = 1/(2 \cdot C2 + 1/R)$.

TABLE 1

Numerical Data of the First Embodiment
X = −0.70 Dptr
m = 0.38×−0.69×
2ω = 54.2°−28.0°

| | r | d | ν | N | |
|---|---|---|---|---|---|
| 1)* | −16.3480 | 1.1000 | 35.09 | 1.57410 | } G 1 |
| 2) | 45.3860 | (d2) | | 1.00000 | |
| 3) | 13.7360 | 3.2000 | 57.57 | 1.49108 | } G 2 |
| 4)* | −11.6630 | (d4) | | 1.00000 | |
| 5) | 285.6440 | 3.6000 | 57.57 | 1.49108 | } G 3 |
| 6)* | −8.5280 | 7.0200 | | 1.00000 | |
| 7)A | ∞ | .7000 | 58.80 | 1.52216 | } A |
| 8) | ∞ | 22.0000 | | 1.00000 | |
| 9)* | 18.5000 | 3.0000 | 57.57 | 1.49108 | } G 4 |
| 10) | −29.5060 | 15.0000 | | 1.00000 | |
| 11) | | (EP) | | | |

The aspherical surface shape in the first surface is shown below.
Cone coefficient: k=−1.500
Aspherical surface coefficient:
C2=0.0000
C4=0.0000
C6=0.0000
C8=2.6134×10$^{-7}$
C10=0.0000

The aspherical surface shape in the fourth surface is shown below.
Cone coefficient: k=−7.120
Aspherical surface coefficient:
C2=0.0000
C4=−2.2770×10$^{-4}$
C6=4.2695×10$^{-6}$
C8=1.4023×10$^{-7}$
C10=−2.6744×10$^{-9}$ The aspherical surface shape in the sixth surface is shown below.
Cone coefficient: k=−1.230
Aspherical surface coefficient:
C2=0.0000
C4=0.0000
C6=0.0000

$C8=-9.9216\times10^{-10}$
$C10=0.0000$

The aspherical surface shape in the ninth surface is shown below.
Cone coefficient: $k=-0.970$
Aspherical surface coefficient:
$C2=0.0000$
$C4=0.0000$
$C6=0.0000$
$C8=-1.0000\times10^{-9}$
$C10=0.0000$ Variations in spacing during magnification change are shown below.

| m | 0.3827 | 0.5144 | 0.6930 |
|---|---|---|---|
| d 2 | 8.8790 | 4.2680 | 0.8180 |
| d 4 | 7.7950 | 11.2310 | 15.8860 |

Condition-corresponding numerical values are shown below.
(1) D/fW=0.780
(2) f1/fW=−2.311
(3) f1/f2=−1.552
(4) f3/f2=1.263
(5) rB/rA=−0.030
(6) ν1=35.09
(7) Ad/fe=0.296

TABLE 2

Numerical Data of the Second Embodiment
X = −0.70 Dptr
m = 0.42x−0.66x
2ω = 52.4°~31.2°

| | r | d | ν | N | |
|---|---|---|---|---|---|
| 1) | −15.6777 | 1.2000 | 35.09 | 1.57410 | } G 1 |
| 2) | 33.8468 | (d2) | | 1.00000 | |
| 3)* | 13.6162 | 3.6000 | 57.57 | 1.49108 | } G 2 |
| 4) | −9.3462 | (D4) | | 1.00000 | |
| 5)* | 16.2139 | 3.6000 | 57.57 | 1.49108 | } G 3 |
| 6) | 15.9508 | 4.3915 | | 1.00000 | |
| 7)A | ∞ | .7000 | 58.80 | 1.52216 | } A |
| 8) | ∞ | 4.5000 | | 1.00000 | |
| 9) | ∞ | 26.0000 | 57.57 | 1.49108 | |
| 10) | −25.4000 | 1.0000 | | 1.00000 | |
| 11) | 23.8000 | 2.4000 | 57.57 | 1.49108 | } G 4 |
| 12) | −147.8000 | 15.0000 | | 1.00000 | |
| 13> | | (EP) | | | |

The aspherical surface shape in the third surface is shown below.
Cone coefficient: $k=-9.515$
Aspherical surface coefficient:
$C2=0.0000$
$C4=0.0000$
$C6=0.0000$
$C8=9.9973\times10^{-7}$
$C10=-7.7249\times10^{-8}$ The aspherical surface shape in the fifth surface is shown below.
Cone coefficient: $k=-10.878$
Aspherical surface coefficient:
$C2=0.0000$
$C4=0.0000$
$C6=0.0000$ $C8=3.1355\times10^{-9}$
$C10=0.0000$ Variations in spacing during magnification change are shown below.

| m | 0.4195 | 0.5266 | 0.6636 |
|---|---|---|---|
| d 2 | 6.3925 | 3.3400 | 0.8696 |
| d 4 | 10.6011 | 13.0065 | 16.0853 |

Condition-corresponding numerical values are shown below.
(1) D/fW=0.448
(2) f1/fW=−1.888
(3) f1/f2=−1.555
(4) f3/f2=1.429
(5) rB/rA=−0.984
(6) ν1=35.09
(7) Ad/fe=0.187

TABLE 3

Numerical Data of the Third Embodiment
X = −0.70 Dptr
m = 0.34x−0.61x
2ω = 55.5°~30.8°

| | r | d | ν | N | |
|---|---|---|---|---|---|
| 1) | 290.1820 | 1.2000 | 35.09 | 1.57410 | |
| 2)* | 4.9335 | 1.7000 | | 1.00000 | |
| 3) | 5.9881 | 2.0000 | 57.57 | 1.49108 | } G 1 |
| 4) | 12.8970 | (d4) | | 1.00000 | |
| 5) | 7.8560 | 2.5000 | 57.57 | 1.49108 | |
| 6) | −63.3900 | 1.5000 | | 1.00000 | |
| 7) | −4.8011 | 2.0000 | 57.57 | 1.49108 | } G 2 |
| 8)* | −4.5998 | (d8) | | 1.00000 | |
| 9) | 17.2013 | 3.2000 | | 1.49108 | } G 3 |
| 10) | −17.2013 | 3.5000 | | 1.00000 | |
| 11) | ∞ | .7000 | 58.80 | 1.52216 | } A |
| 12)A | ∞ | 24.4000 | | 1.00000 | |
| 13)* | 19.0300 | 2.4000 | 57.57 | 1.49108 | } G 4 |
| 14) | −34.8090 | 16.0000 | | 1.00000 | |
| 15> | | (EP) | | | |

The aspherical surface shape in the second surface is shown below.
Cone coefficient: $k=0.668$
Aspherical surface coefficient:
$C2=0.0000$
$C4=0.0000$
$C6=0.0000$
$C8=2.2084\times10^{-7}$
$C10=0.0000$ The aspherical surface shape in the eighth surface is shown below.
Cone coefficient: $k=0.257$
Aspherical surface coefficient:
$C2=0.0000$
$C4=0.0000$
$C6=0.0000$
$C8=5.7063\times10^{-7}$
$C10=0.0000$ The aspherical surface shape in the thirteenth surface is shown below.
Cone coefficient: $k=-0.740$
Aspherical surface coefficient:
$C2=0.0000$
$C4=0.0000$
$C6=0.0000$ $C8 = -5.0000 \times 10^{-10}$ $C10 = 0.0000$ Variations in spacing during magnification change are shown below.

| m   | 0.3365  | 0.4543  | 0.6134  |
|-----|---------|---------|---------|
| d 4 | 9.2281  | 4.5364  | 1.0614  |
| d 8 | 12.5820 | 16.0569 | 20.7486 |

Condition-corresponding numerical values are shown below.

(1) D/fW=0.466
(2) f1/fW=−1.876
(3) f1/f2=−1.191
(4) f3/f2=1.348
(5) rB/rA=−1.000
(6) v1=35.09
(7) Ad/fe=0.156

As described above, according to the present invention, there can be provided a Keplerian zoom finder which is simple in construction and yet in which aberrations are corrected well and dust or the like in the field of view during observation is inconspicuous and through which it is easy to see.

What is claimed is:

1. A Keplerjan finder optical system having an objective lens unit comprising optical elements including, in succession from the object side, a first lens unit of negative refractive power, a second lens unit of positive refractive power and a third lens unit of positive refractive power and having positive refractive power as a whole, a plane parallel plate made of glass with a field frame disposed thereon, and an eyepiece unit, air gaps extending from opposite sides of said plane parallel plate, optical elements disposed at said opposite sides of said plane parallel plate being made of plastic, each of said air gaps being wide as compared with thickness of said plane parallel plate so as to prevent scratches on the surfaces of and dust in said optical elements from being observed through said eyepiece unit.

2. A Keplerian finder optical system according to claim 1, satisfying the following condition:

$$0.14 < Ad/fe, \qquad (7)$$

where Ad is the shorter air gap of the air gaps extending from opposite sides of the plane parallel plate, and fe is the focal length of the eyepiece unit.

\* \* \* \* \*